Feb. 2, 1971     I. M. GUROL ET AL     3,559,467
STRAIN MEASURING DEVICE
Filed Oct. 8, 1968
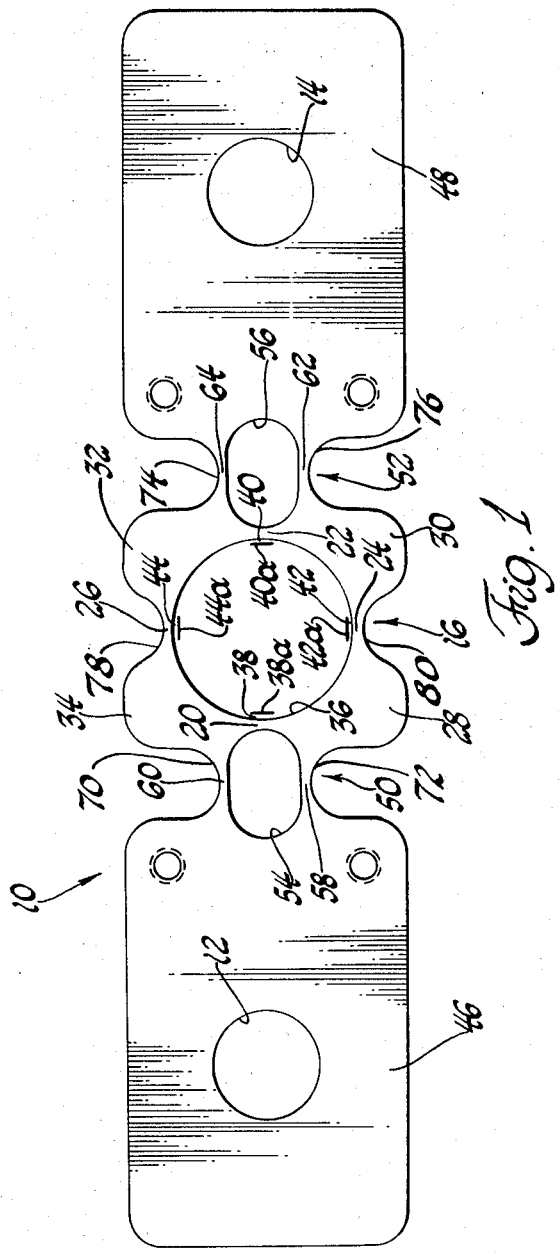
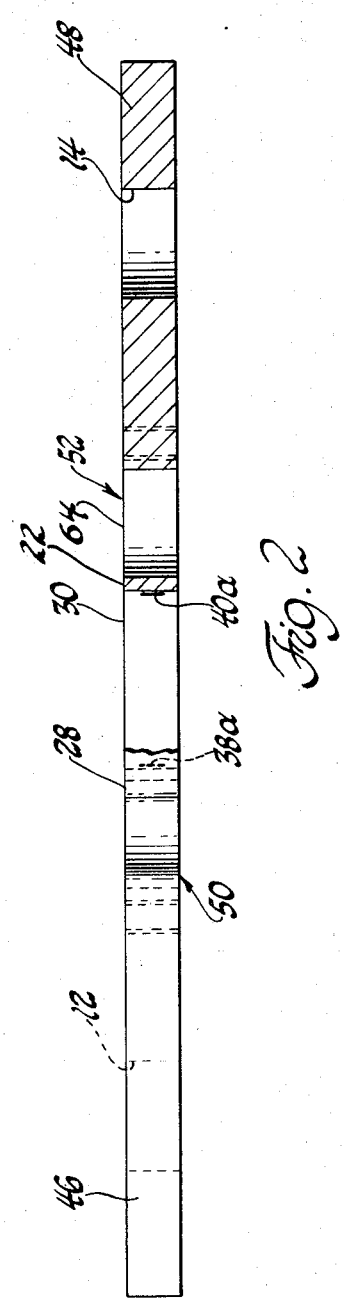
INVENTORS
Ismail Macit Gurol, &
BY Ralph S. Shoberg
Barnard, McGlynn & Reising
ATTORNEYS United States Patent Office 3,559,467
Patented Feb. 2, 1971

3,559,467
STRAIN MEASURING DEVICE
Ismail Macit Gurol and Ralph S. Shoberg, Farmington, Mich., assignors to GSE, Inc., Farmington, Mich., a corporation of Michigan
Filed Oct. 8, 1968, Ser. No. 765,877
Int. Cl. G01l 1/00, 7/16
U.S. Cl. 73—88.5         13 Claims

ABSTRACT OF THE DISCLOSURE

A strain measuring device including a body having a pair of end sections with a strain amplifying section therebetween. The strain amplifying section has a plurality of flexure points subject to bending in response to linear displacement between the end sections. Surface portions adjacent the flexure points are therefore subjected to bending strain of greater magnitude than the average linear strain.

---

This invention relates generally to strain transducers, and is particularly concerned with the construction of a strain measuring device for sensing linear strain between two points and producing localized strain for measurement by strain gages that is greater in magnitude than the average strain between the two points.

Measurement of strain by strain transducers usually involves the attachment of strain gages such as the electrical resistance type or semiconductor type to the surface of a member subjected to strain whereby a change in the length of the member due to strain produces an electrical output, or a change in electrical output, that can be indicated at a remote point. The sensitivity of such strain gages is limited by their low electrical output. Thus, if a strain gage is simply attached to the surface of a member, the strain gage will be subjected only to the average strain over the length of the member being stressed and subjected to strain or deformation. The input signal to the strain gage will therefore be dependent upon the average strain, which may be very small even though the actual deformation of the body between two points is significant.

It is therefore an object of this invention to amplify the average strain between two points to provide a larger input signal to a strain gage per unit of deformation between the two points.

In carrying out the foregoing, and other objects, a strain measuring device according to the present invention comprises a body having a pair of end sections with a strain amplifying section therebetween. A plurality of flexure points are defined on the strain amplifying section that are responsive to linear displacement between the attachment points to produce bending such that the strain on the surface adjacent the flexure point is greater than the average strain between the two points.

Other objects, advantages and features of the invention will become apparent from the following description taken in connection with the accompanying drawings in which:

FIG. 1 is a plan view of a strain measuring device according to the present invention; and FIG. 2 is an elevational view of the device shown in FIG. 1.

The drawings illustrate a strain measuring device comprising a body 10 having a pair of attachment points defined by holes 12 and 14 with a center strain amplifying section 16 therebetween. The center, strain amplifying section 16 has a central opening defining an endless surface 36 and means 28, 30, 32 and 34 cooperating with the endless surface 36 to define a plurality of flexure points 20, 22, 24 and 26 on the strain amplifying section having reduced resistance to deformation and operable in response to linear displacement between the attachment points 12 and 14 to bend and produce both tensile and compressive bending strain at spaced locations on the endless surface 36 of greater magnitude than the average linear strain between the attachment points. The means 28, 30, 32 and 34 includes portions of relatively high resistance to deformation which are operable to concentrate strain at the flexure points. The endless surface 36 is cylindrical in the illustrated embodiment with a diameter extending along the longitudinal axis of body 10 between the attachment points 12 and 14.

The aforementioned flexure points include a first pair of flexure points 20 and 22 located on diametrically opposite sides of the endless surface 36 along the longitudinal axis of body 10 extending between the attachment points 12 and 14, and a second pair of flexure points 24 and 26 on diametrically opposite sides of surface 36 located on a diameter normal to the longitudinal axis of body 10. The portions of the endless surface adjacent one of the aforementioned pairs of flexure points are subjected to compressive bending strain and the portions of the endless surface 36 adjacent the other of the aforementioned pairs of flexure points is subjected to tensile bending strain in response to linear displacement between the attachment points 12 and 14. More specifically, when a tension force is applied to body 10 at attachment points 12 and 14 tending to separate attachment points 12 and 14, portions 38 and 40 of the endless surface 36 adjacent the flexure points 20 and 22, respectively, are subjected to compressive bending strain; and the portions 42 and 44 of the endless surface 36 adjacent flexure points 24 and 26, respectively, are subjected to tensile bending strain.

The strain amplifying section 16 includes a pair of oppositely extending connecting portions 50 and 52 connecting the strain amplifying section 16 with end sections 46 and 48 including the attachment points 12 and 14. Openings 54 and 56 are included in each of the connecting portions 50 and 52, respectively, to define a pair of webs 58 and 60 extending between the end section 46 and the center strain amplifying section 16 and a pair of webs 62 and 64 extending between end section 48 and the center strain amplifying section 16. Openings 54 and 56 cooperate with the endless surface 36 to define the first pair of flexure points 38 and 40. The portions of high resistance to deformation each comprises an outwardly projecting lobe extending from one of the webs to one of the flexure points 24 and 26.

An axial load applied to body 10 will result in the endless surface 36 tending to deform into an oblong shape and produce bending in one direction at flexure points 20 and 22, and bending in the opposite direction at flexure points 24 and 26 as pointed out herein above. Thus, the portions 38 and 40 of the cylindrical surface 36 will be subjected to compressive bending strain when a tension load is applied to body 10, and portions 42 and 44 of surface 36 will be subjected to tensile bending strain when the body 10 is subjected to tension loading. Conversely, linear deformation in the opposite direction, or when the body 10 is subjected to a compression load, will result in compressive bending strain at portions 42 and 44, and tensile bending strain at portions 38 and 40 of the cylindrical surface 36. The portions 28, 30, 32 and 34 are of high resistance to deformation and each comprises an outwardly projecting lobe extending from one of the connecting webs to one of the flexure points 24 and 26. For example, portion 28 comprises a lobe extending from web 58 to the flexure point 24, and portion 30 comprises a lobe extending from flexure point 24 to the connecting web 62.

Reference numerals 38a, 40a, 42a and 44a schematically indicate strain sensitive elements attached respectively to the portions 38, 40, 42 and 44 of the cylindrical endless surface 36. The strain sensitive elements may be conventional resistance strain gages connected in a typical Wheatstone bridge circuit but, of course, other types of strain sensing devices, such as semiconductor strain sensitive elements, would be suitable. Thus, when a tension load is applied to body 10, the strain sensitive elements 38a and 40a are subjected to compressive strain and the strain sensitive elements 42a and 44a are subjected to tensile bending strain. By making the curvature of the outer surface of flexure points 24 and 26 the same as the outer surfaces of the flexure points 20 and 22 with the distance between the inner and outer surfaces substantially equal, the compressive bending strain at the surface portions 38 and 40 will be substantially equal in magnitude to the tensile bending strain at portions 42 and 44 of surface 36.

The mid-point of the connecting web 60, for example, serves as a pivot or hinge point for the lobe 34 when the body 10 is subjected to strain tending to cause linear displacement between attachment points 12 and 14. With tension forces applied at attachment points 12 and 14, lobe 34 will tend to "pivot" or bend around the hinge point at the mid-portion of web 60 in a clockwise direction and lobe 28 will tend to pivot around the mid-point of web 58 in a counterclockwise direction to produce compression bending strain at portion 38 of surface 36. Furthermore, similar pivoting action of lobe 32 about the mid-point of web 64 in a counterclockwise direction and pivoting of lobe 30 in a clockwise direction about the mid-point of web 62 will cause compression bending strain at portion 40 of surface 36, and the combined action will cause tensile bending strain at portions 42 and 44 of surface 36.

In the illustrated embodiment, body 10 of the strain measuring device is generally rectangular, the center section 16 and end sections 46 and 48 being defined by first and second recesses 70 and 72 extending inwardly from opposite sides of body 10 to define the first reduced connecting portion 50 between end section 46 and the center section 16. Third and fourth recesses 74 and 76, respectively, spaced from the first and second recesses 70 and 72, extend inwardly from opposite sides of body 10 and cooperate to define the second reduced connecting portion 52 between end section 48 and the center section 16. The central cylindrical opening is defined in the center section 16 to define the endless surface 36. Thus, the oblong openings 54 and 56 in the first and second connecting portions 50 and 52, respectively, define with the central opening the first pair of flexure points 20 and 22. Fifth and sixth recesses 78 and 80, respectively, extend inwardly from opposite sides of body 10 between the first and third recesses 70 and 74 and between the second and fourth recesses 72 and 76, respectively, to cooperate with the central opening to define the second pair of flexure points 24 and 26 on the diameter of the central opening normal to the longitudinal axis of the body. Thus, the lobe 34 is defined by the first recess 70 and fifth recess 78 and the lobe 32 is defined by the fifth recess 78 and the third recess 74. Furthermore, the lobe 28 is defined by the second recess 72 and the sixth recess 80 and the lobe 30 is defined by the sixth recess 80 and the fourth recess 76. To provide for uniformity of response, the inner ends of each of the fifth and sixth recesses are curved and are of the same radius of curvature. Moreover, the surface defining the inner ends of the recesses 78 and 80, that is, the same surface that defines the outer surfaces of the flexure points 24 and 26, are spaced from the surface 36 of the central opening a substantially equal amount. Furthermore, the ends of the openings 54 and 56 in each of the connecting portions 50 and 52 are curved with the same radius as that of the inner ends of the recesses 78 and 80 and are spaced from the surface 36 defining the wall of the central opening an amount substantially equal to the spacing of the inner ends of recesses 78 and 80 from the surface of the central opening. As a result, the surface portions 38, 40, 42 and 44 are strained a substantially equal amount in response to linear displacement between the end sections. As pointed out previously, the strain gages 38a and 40a are subjected to compressive bending strain and strain gages 42a and 44a are subjected to tensile bending strain when tension force is applied to body 10 tending to elongate body 10.

While a specific form of the invention is illustrated in the accompanying drawings and described in the foregoing specification, it should be understood that the invention is not limited to the exact construction shown. To the contrary, various alternative constructions, all falling within the scope and spirit of the invention, will be apparent to those skilled in the art.

The embodiments of the invention in which an exclusive property or privilege is claimed are defined as follows:

1. A strain measuring device comprising: a body having a pair of attachment points with a strain amplifying section therebetween; a cylindrical opening in said strain amplifying section defining an endless cylindrical surface with a diameter extening along the axis of said body between said attachment points; means including portions of relatively high resistance to deformation cooperating with said endless surface to define a plurality of flexure points on said strain amplifying section having reduced resistance to deformations; said flexure points being operable in response to linear displacement between said attachment points to bend and produce both tensile and compressive bending strain on said endless surface of greater magnitude than the average linear strain between said attachment points, said portions of relatively high resistance to strain being operable to concentrate strain at said flexure points; said plurality of flexure points including a first pair of flexure points located on diametrically opposite sides of said surface along said axis and a second pair of flexure points on diametrically opposite sides of said surface on a diameter normal to said axis wherein the portions of said endless surface adjacent one of said pairs of flexure points are subjected to compressive bending strain and the portions of said endless surface adjacent the other of said pairs of flexure points is subjected to tensile bending strain in response to linear displacement between said attachment points; the outer surfaces of said flexure points being defined by curved surfaces extending inwardly between each adjacent pair of said portions of relatively high resistance to strain; all of said curved surfaces having the same curvature and spaced the same distance from said endless surface.

2. A strain measuring device as claimed in claim 1 including a pair of connecting portions extending in opposite directions from each other and connecting the strain amplifying section with said end sections.

3. A strain measuring device as claimed in claim 2 including an opening in each of said connecting portions defining the curved outer surfaces of said first pair of flexure points and defining a pair of webs extending between each of said end sections and said strain amplifying section.

4. A strain measuring device comprising: a body having a pair of end sections with a strain amplifying section therebetween; an opening in said strain amplifying section; oppositely extending connecting portions of reduced size connecting said strain amplifying section with said end sections; and means cooperating with said opening to define first and second pairs of flexure points on said strain amplifying section subject to bending in response to linear displacement between said end sections such that the surface of said opening adjacent one pair of said flexure points is subjected to tensile bending strain and the surface of said opening adjacent the other pair of said flexure points is subjected to compressive bending strain; said means comprising portions reduced in area between the surface of said opening and the periphery of the material surrounding said opening at each of said flexure points, the surfaces of said portions reduced in area being located the same distance from the surface of said opening and being of the same configuration such that the magnitude of the strain at said flexure points will be substantially equal.

5. A strain measuring device comprising: a generally rectangular body; said body having a center section and a pair of end sections defined by first and second recesses extending inwardly from opposite sides of said body to define a first reduced connecting portion between one end section and the center section, third and fourth recesses extending inwardly from opposite sides of said body and spaced from the first and second recesses cooperating to define a second reduced connecting portion between the other end section and the center section; a central cylindrical opening in the center section; an opening in each of the first and second connecting portions defining with said central opening a first pair of flexure points; fifth and sixth recesses extending inwardly from opposite sides of said body between the first and third recesses and between the second and fourth recesses, respectively, to cooperate with the central opening to define a second pair of flexure points on the diameter of the central opening normal to the longitudinal axis of said body; said fifth recess cooperating with the second and fourth recesses to define outwardly projecting lobes each extending between one of the connecting portions and one of the first pair of flexure points, the inner ends of each of said fifth and sixth recesses being curved and of the same radius of curvature, and being spaced from the surface of the central opening a substantially equal amount.

6. A strain measuring device comprising: a generally rectangular body; said body having a center section and a pair of end sections defined by first and second recesses extending inwardly from opposite sides of said body to define a first reduced connecting portion between one end section and the center section, third and fourth recesses spaced from the first and second recesses and extending inwardly from opposite sides of said body and cooperating to define a second reduced connecting portion between the other end section and the center section; a central cylindrical opening in the center section; an opening in each of said first and second connecting portions defining with said central opening a first pair of flexure points; fifth and sixth recesses extending inwardly from opposite sides of said body between the first and third recesses and between the second and fourth recesses, respectively, to cooperate with the central opening to define a second pair of flexure points on the diameter of the central opening normal to the longitudinal axis of the body; the openings in said first and second connecting portions having the same radius of curvature as said fifth and sixth recesses and being spaced the same distance from said central opening as said fifth and sixth recesses; and a strain sensitive element mounted on the surface of the central opening at each of said flexure points.

7. A strain measuring device comprising: a body having a strain amplifying section; an opening in said strain amplifying section defining an endless surface; four recesses formed in said strain amplifying section each extending toward said opening, said recesses being angularly spaced ninety degrees from each other and having the same configuration and being symmetrically oriented with respect to said opening to cooperate with said opening to define four flexure points, the inner surface of each flexure point being defined by said endless surface and the outer surface of each flexure point being defined by the associated recess with the distance between the inner and outer surfaces of the flexure points being equal.

8. A strain measuring device as claimed in claim 7 including a pair of connecting webs extending from opposite sides of one of said recesses and in the opposite direction from said opening, and a pair of connecting webs extending from opposite sides of the recess located 180 degrees from said one recess and in the opposite direction from said opening.

9. A strain measuring device as claimed in claim 5 wherein said portions of high resistance to deformation each comprises an outwardly projecting lobe extending from one of said webs to one of said second pair of flexure points.

10. A strain measuring device as claimed in claim 4 wherein said first pair of flexure points are located on the longitudinal axis of said body on opposite sides of the center of said opening and said second pair of flexure points are located on opposite sides of the longitudinal axis of said body on a line normal to said longitudinal axis and passing through the center of said opening.

11. A strain measuring device as claimed in claim 10 further comprising a pair of lobes projecting outwardly on opposite sides of each of said second pair of flexure points, each of said lobes being defined between one of the connecting portions and one of said second pair of flexure points.

12. A strain measuring device as claimed in claim 11 further comprising an opening in each of said connecting portions cooperating with the opening in said strain amplifying section to define said first pair of flexure points, the openings in said connecting portions each defining a pair of webs on the respective connecting portions.

13. A strain measuring device as claimed in claim 5 wherein the ends of the openings in each of said connecting portion adjacent the central opening are curved and are of the same radius as that of the inner ends of said fifth and sixth recesses, said last named ends being spaced from the surface of the central opening an amount substantially equal to the spacing of the inner ends of said fifth and sixth recesses from the surface of said central opening.

References Cited

UNITED STATES PATENTS

| | | | |
|---|---|---|---|
| 2,561,318 | 7/1951 | Ruge | 201—63 |
| 3,130,383 | 4/1964 | Hottinger | 338—5 |
| 3,309,921 | 3/1967 | Eckard | 73—141 |
| 3,315,203 | 4/1967 | Jacobson | 338—5 |

RICHARD C. QUEISSER, Primary Examiner

J. WHALEN, Assistant Examiner

U.S. Cl. X.R.

73—141; 338—2